Sept. 13, 1966  L. R. DEAN ETAL  3,272,580
ARTICLE STORAGE EQUIPMENT
Filed Aug. 26, 1964  5 Sheets-Sheet 1

INVENTORS.
LAWRENCE R. DEAN
DONALD A. GUNN
BY
ATTORNEY

INVENTORS.
LAWRENCE R. DEAN
DONALD A. GUNN
BY
ATTORNEY

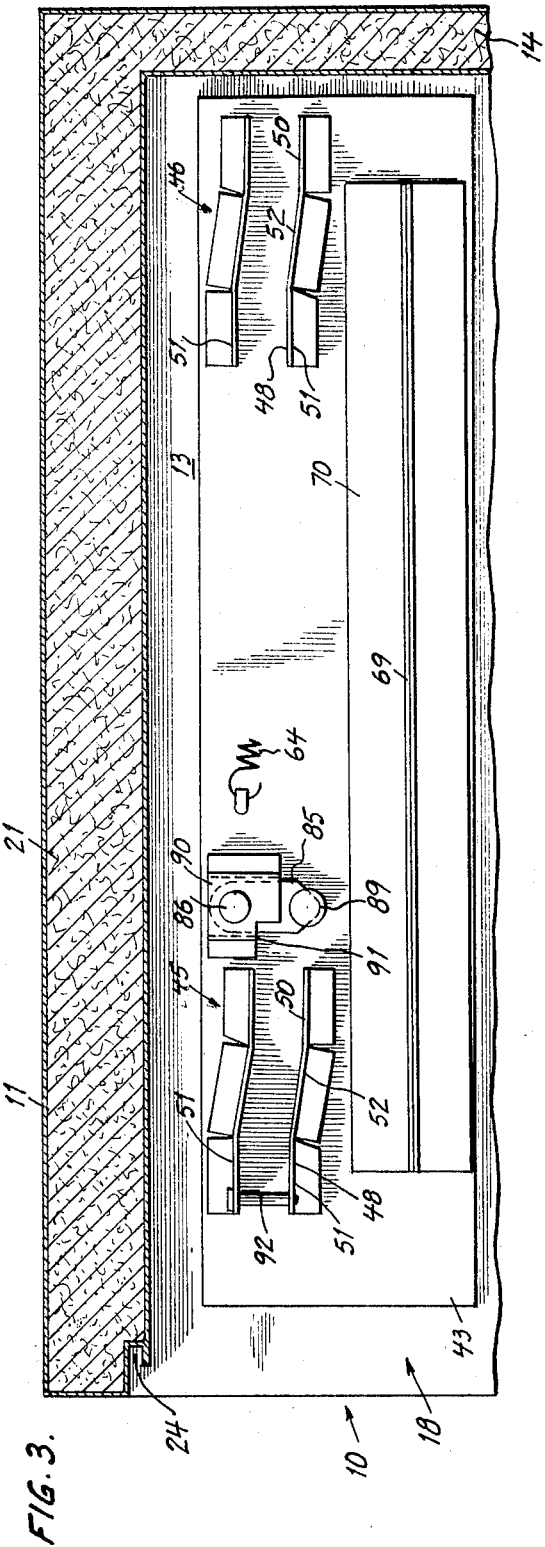
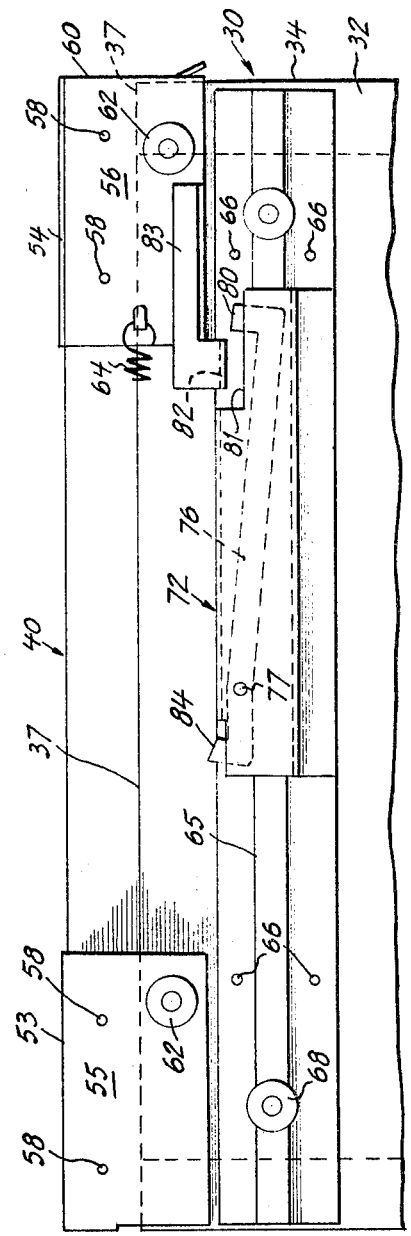
FIG. 3.
FIG. 4.
INVENTORS.
LAWRENCE R. DEAN
DONALD A. GUNN
BY
ATTORNEY

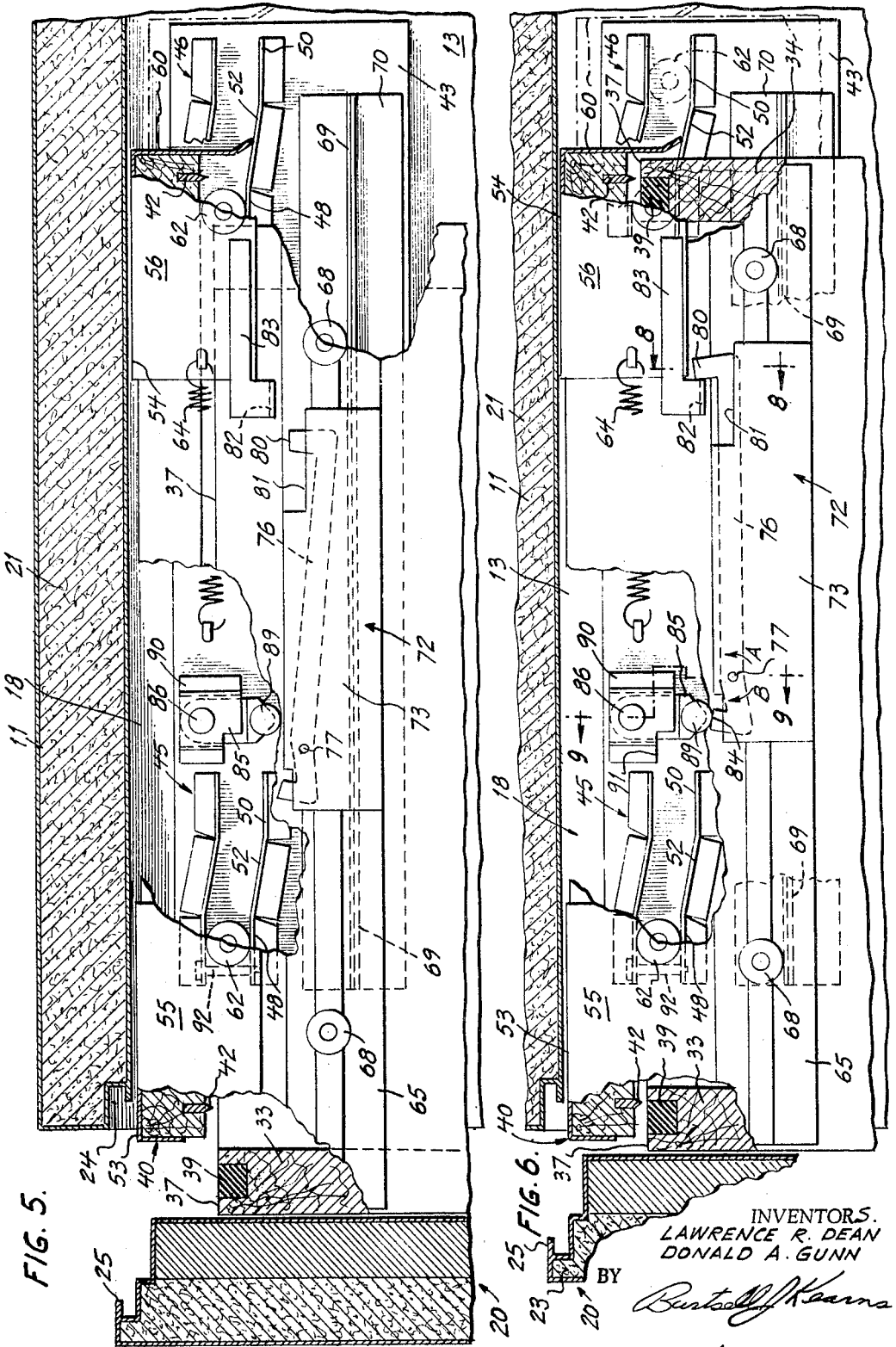

Sept. 13, 1966     L. R. DEAN ETAL     3,272,580
ARTICLE STORAGE EQUIPMENT
Filed Aug. 26, 1964     5 Sheets-Sheet 5
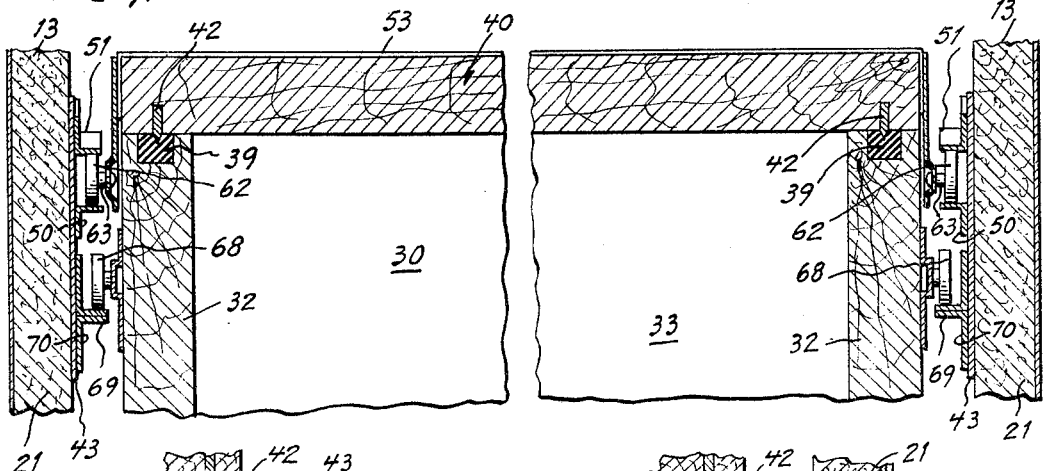
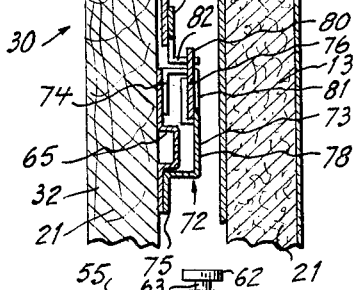
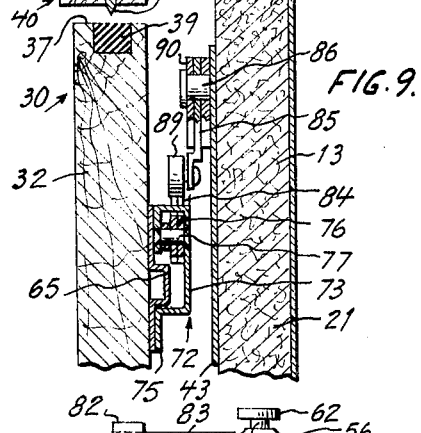
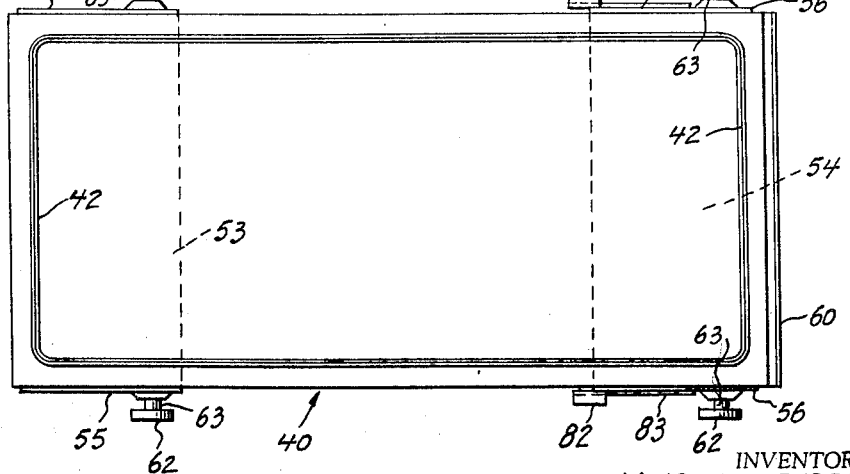
INVENTORS.
LAWRENCE R. DEAN
DONALD A. GUNN
BY
*Burtell J. Kearns*
ATTORNEY United States Patent Office 3,272,580
Patented Sept. 13, 1966

3,272,580
ARTICLE STORAGE EQUIPMENT
Lawrence R. Dean, Devola, Ohio, and Donald A. Gunn, Tonawanda, N.Y., assignors to Sperry Rand Corporation, New York, N.Y., a corporation of Delaware
Filed Aug. 26, 1964, Ser. No. 392,084
18 Claims. (Cl. 312—214)

The present invention relates to article storage equipment and more particularly to fire resistant article storage equipment.

In certain types of fire resistant storage equipment, as for example filing cabinets, safes and the like, it is well known to provide such equipment with a casing comprising an outer metal housing in which is contained an inner wall of heat resistant insulating material such as gypsum, Portland cement or the like. In this equipment, the fire resistant material provides a protective wall about a storage compartment located within the unit to protect documents or the like stored in the compartment from destruction during fire. When a unit of this type is subjected to intense heat, chemically bound water contained in the insulated lining evaporates to steam. As the steam penetrates to a cooler area within the insulation it condenses subject to evaporation when the heat reaches the latter area. The evaporation and condensation of the chemically bound water is continuously repeated as the temperature increases and the heat penetrates the material. In this manner an efficient heat barrier is provided between the intense heat generated by a fire and the contents of the storage compartment in a well known manner. In this type equipment, however, a portion of the steam and other hot gases generated during a fire escapes into the storage area of the unit.

In present business establishments there is a steadily increasing amount of information recorded and maintained on magnetic tape and microfilm and which records are of extreme importance to the proper functioning of these businesses. These records must be readily available for use and reference during the course of the everyday operation of these businesses. At the same time, means must be provided to protect the records from fire or extreme changes in atmospheric conditions such as changes in temperature and humidity conditions. The magnetic tape and microfilm records are not only more vulnerable to destruction and deterioration at lower temperatures than, for example the usual paper documents, but also are subject to rapid deterioration if contacted by steam or hot gases. In the past additional precautions were necessarily taken in the storage of these records in known insulated equipment, such as special spool containers or the like to afford minimum added protection for the magnetic tape and microfilm.

It is an object of this invention to provide a novel fire resistant storage device.

Another object of this invention is to provide a fire resistant storage device which includes novel means for providing protection for stored articles made of heat destructible material.

A further object is to provide a novel hermetically sealed storage container for use with a fire resistant storage unit and which container is effective to reduce the transfer of heat and the conduction of hot gases or steam into the interior of the container.

A still further object is to provide a novel hermetically sealed storage container to be carried by a drawer of a fire resistant filing cabinet.

Another object is to provide a novel and readily operable mechanism for sealing a cover to a heat resistant container arranged within a drawer of a fire resistant filing cabinet when the drawer is moved to a closed position and which mechanism is further readily operable to remove the cover when the drawer is moved to an open position.

The present invention contemplates a fire resistant storage unit having novel means for protecting stored articles of heat destructible material, as for example magnetic tapes, microfilm, and other valuables from damage due to heat, hot gases or steam generated within the storage area of the storage unit during intense heat. In one embodiment thereof the novel means include a container having a cover hermetically sealed thereto and which container is adapted to store the mentioned items within the drawer of an insulated filing cabinet. The container is carried by the drawer and is adapted for movement with the drawer into and out of a compartment provided in the cabinet casing. Means are provided on the opposite sidewalls of the compartment for mounting the container cover for movement to a position within the compartment out of engagement with the container when the drawer is moved to open position. Means are also provided to move the cover on the mounting means into sealing engagement with the container when the drawer is moved to a closed position. The hermetic seal between the cover and container is effective to prevent hot gases and steam generated during intense heat from entering the container. In addition, the invention contemplates that the container and cover be made of a material having a low thermal conductance factor whereby a second heat barrier, in addition to the insulated walls of the compartment, is provided for the protection of the contents of the cabinet.

The above and other such objects and advantages of the present invention will appear more fully hereinafter from a consideration of the detailed description which follows, taken together with the accompanying drawings wherein one embodiment of the invention is illustrated.

In the drawings:

FIG. 3 is a side elevational view as seen at the left in FIG. 7 of a mounting plate for the container cover;

FIG. 4 is a fragmentary side elevational view of the container removed from a drawer and shows the cover in sealed engagement therewith;

FIG. 5 is a side elevational view, partly in cross-section, of the drawer and container and shows the drawer in a position moved outwardly of a compartment with the cover disengaged from the container;

FIG. 6 is a view similar to FIG. 5 and shows the container in latched engagement with the cover prior to complete closing of the drawer and sealing of the cover to the container;

FIG. 7 is a sectional view taken on the line 7—7 of FIG. 2;

FIG. 8 is a sectional view, taken on the line 8—8 of FIG. 6;

FIG. 9 is a sectional view taken on the line 9—9 of FIG. 6;

FIG. 10 is a bottom view of the container cover; and

FIG. 11 is a cross sectional elevational view of a modified form of sealing means for the cover and container.

Figure 1:
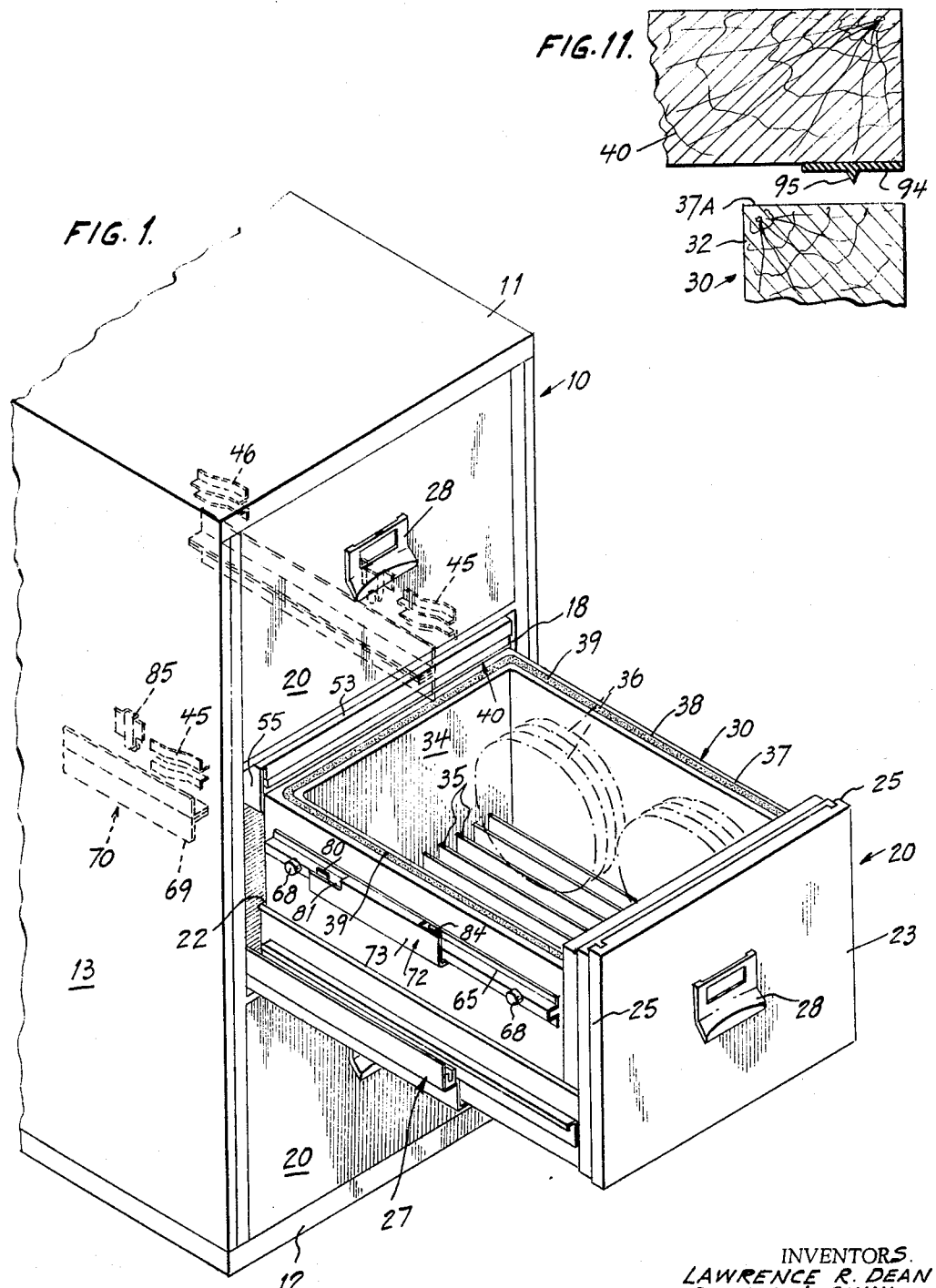
FIG. 1 is a perspective view of a portion of an insulated filing cabinet in which one embodiment of the present invention is illustrated as incorporated in a fire resistant filing cabinet and shows one drawer of the filing cabinet in open position.
Figure 2:
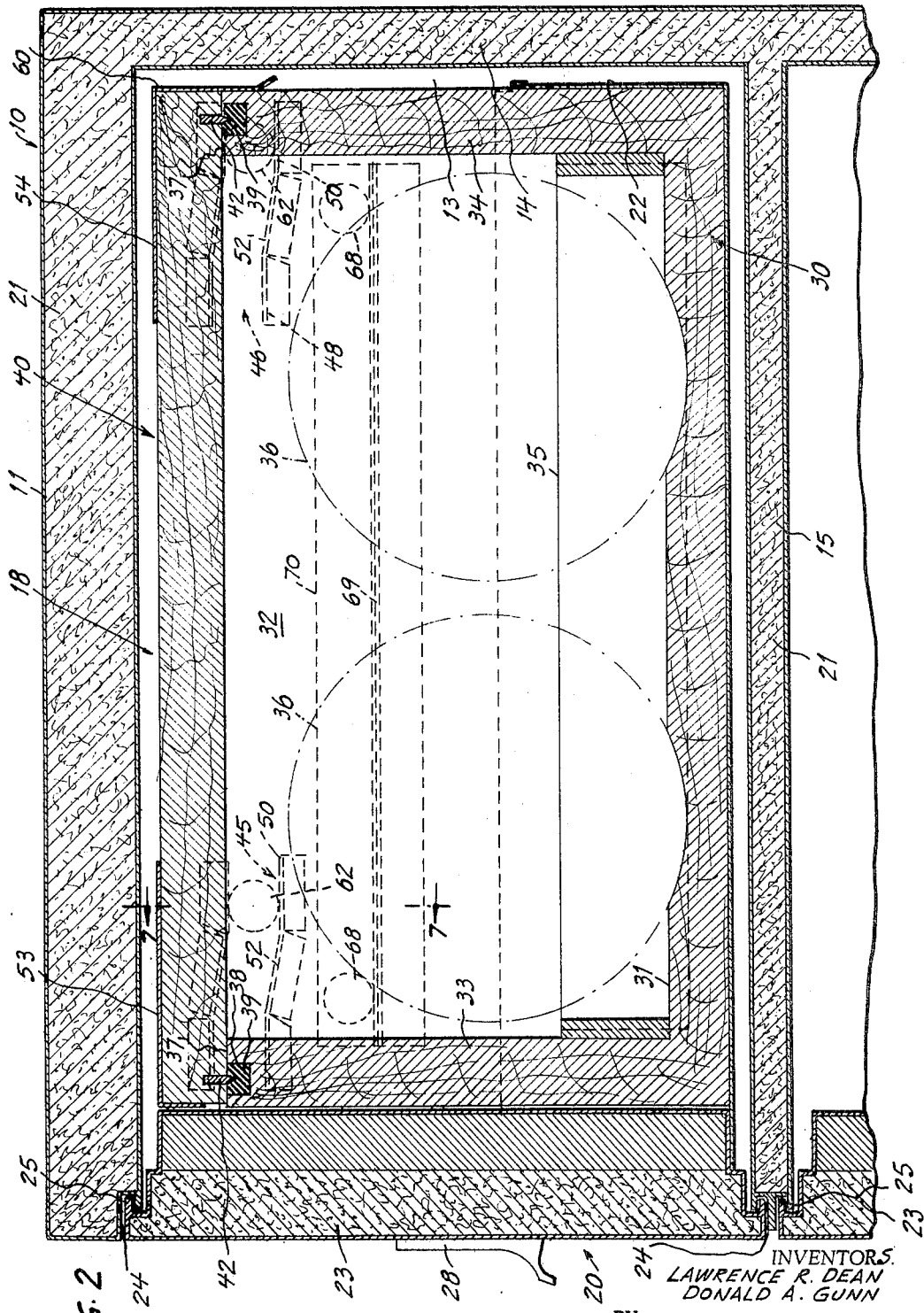
FIG. 2 is a cross sectional elevational view taken through a compartment of the filing cabinet and illustrates a drawer in closed position, and in which drawer is arranged the novel storage container having a cover in sealed engagement therewith.

Referring now to the drawings for a more detailed description of the present invention, a fire resistant filing cabinet of conventional construction is generally indicated by the reference numeral 10 in FIG. 1 and illustrates by way of example a fire resistant storage device which incorporates an embodiment of the present invention. Filing cabinet 10 (FIGS. 1 and 2) includes the top, bottom, side and rear walls 11, 12, 13, and 14 respectively. Spaced horizontal partition walls 15 (one shown in FIG. 2) are provided within cabinet 10 to provide spaced superimposed storage compartments 18 in a usual manner within filing cabinet 10 with each compartment 18 housing a movable drawer 20. As seen in FIG. 2, the walls of filing cabinet 10 and partition wall 15 are filled with a lining 21 of heat resistant material such as gypsum or other material of similar character commonly used in insulated equipment of this type. Each drawer 20 is provided with an insulated lining 21 in the front wall 23 thereof. The peripheral edges of the casing walls which frame the openings of each compartment 18 are provided with grooves 24 (partially shown in FIGS. 2, 3, 4, and 6) adapted to receive complementary projections 25 provided on front wall 23 of drawer 20 to seal compartment 18 when a drawer 20 is closed as seen with respect to drawer 20 in FIG. 2.

Each drawer 20 is mounted for sliding horizontal movement into and out of its associated compartment 18 between a fully open position (such as shown in FIG. 1) to a closed position (FIG. 2) on any suitable drawer suspension mechanism 27, such as the general type disclosed in U.S. Patent No. 2,331,529 to Wolters et al., dated October 12, 1943 and which suspension mechanisms 27 are mounted at the opposite sidewalls 13 of a compartment 18 (only one shown at the left in FIG. 1). A handle 28 is provided on the front closure wall 23 of each drawer 20 so that each drawer 20 may be manually moved on suspension mechanism 27 into and out of a compartment 18 in the usual manner.

It is to be understood that the structure thus far described refers to conventional structure as found in known fire resistant filing cabinets and that the present invention which is to be hereinafter described in detail is not limited to the particular filing cabinet shown. The drawings having been simplied so as to show only conventional parts of filing cabinet 10 as being necessary for a clear understanding of the present invention.

In fire resistant storage equipment of this type it is known that when the unit is subjected to intense heat, such as a fire, that steam is released by chemically bound water contained in insulated lining 21 to provide a protecitve barrier between the heat and the contents of compartment 18. However, portions of this steam and other hot gases generated during the fire eventually enter compartments 18.

It is one of the features of the present invention to provide protection for heat destructible articles and in particular such articles as magnetic tape, microfilm or the like which are stored in compartments such as a compartment 18; such articles if left exposed therein are subject to destruction by the steam or hot gases which might enter the compartment. To this end, a container 30 (FIGS. 1 and 2) is disposed within each drawer 20. Each container 30 is formed of a suitable material having a low thermal or heat conductance factor. In a preferred embodiment, container 30 is formed of wood having a thermal conductance factor selected between the ranges of .44 to 1.30 B.t.u./(hr.)/° F./sq. ft./thickness. It has been found that redwood, basswood or woods commonly sold under the tradename "Presdwood" are particularly suitable for use in the construction of container 30. Container 30 comprises bottom, side, front, and rear walls 31, 32, 33, and 34 (FIG. 2) respectively and which wall portions are joined together by any suitable fastening means such as by a suitable adhesive and nails (not shown) to provide an open box container having selected outer dimensions to allow container 30 to fit closely within the space defined by the front wall 23 and rear wall 22 of drawer 30 (FIGS. 1 and 2). A plurality of spaced divider panels 35 (FIGS. 1 and 2) are arranged within container 30 and which divider panels 35 extend lonigtudinally of container 30 and are connected at their opposite end edges to the front and rear walls 33 and 34 respectively of container 30 in any suitable manner. Adjacent divider panels 35 house therebetween reels of magnetic tape or microfilm which are diagrammatically indicated by the reference numeral 36 in FIGS. 1 and 2.

The peripheral upper exposed edges 37 of container 30 (FIGS. 1 and 2) are provided with a continuous groove 38 and in which groove 38 is seated a sealing gasket member 39 formed of a suitable resilient material such as rubber or silicone rubber. A rectangular cover of lid member 40 (FIG. 2) is provided for each container 30 and is formed preferably of the same material as container 30. A metal blade 42 is embedded in the peripheral marginal portions of the bottom of cover 40 (FIGS. 2, 7, and 10) and which blade 42 is engaged in gasket 39 of container 30 to provide a hermetically sealed storage unit within compartment 18 when drawer 20 is in a closed position as shown in FIG. 2.

Spaced means are provided on sidewalls 13 of cabinet 10 within a compartment 18 for mounting cover 40 for movement within the confines of compartment 18 out of engagement with container 30 when drawer 20 is moved to open positon. The cover mounting means include a mounting plate 43 (FIGS. 3 and 7) secured to each sidewall 13 of cabinet 10 within a compartment 18. Mounting plates 43 and the means on cover 40 to mount cover 40 thereon are identical at each sidewall 13 of compartment 18 and the description hereinafter set forth is directed to sidewall 13 as viewed from the left in FIG. 1 and as illustrated in FIGS. 2 and 3. Spaced camming channel track members 45 and 46 (FIG. 3) are provided in the spaced corners of plate 43 with each track member 45 and 46 including an upper horizontal track run portion 48 and a lower horizontal track run portion 50 formed by flanges 51 in the body portion of plate 43. Each pair of track run portions 48 and 50 is interconnected by an inclined track run portion 52.

Means are provided to support cover 40 for movement on camming track members 45 and 46 and which means include brackets 53 and 54 (FIG. 4) which extend across the top surface of cover 40 at the front and rear thereof. Brackets 53 and 54 are provided with spaced downwardly extending side flange portions 55 and 56 at the opposite sidewalls of cover 40 and are secured thereto by screws 58. Flanges 55 and 56 project below the upper peripheral edge 37 (FIG. 4) of container 30 and lie closely adjacent sidewalls 32 of container 30. Rear cover bracket 54 is provided with a flange 60 and which flange 60 extends below upper edge 37 of container rear wall 34.

In order to mount cover 40 on mounting plates 43 ball bearing rollers 62 (FIGS. 4 and 10) are rotatably mounted on studs 63 secured to flanges 55 and 56. In closed position of cover 40 on container 30 (FIG. 2), rollers 62 are disposed in the lower track run portions 50 of their associated camming tracks 45 and 46 on opposite sidewalls 13 of compartment 18. An elongated tension spring member 64 for purposes to be hereinafter explained has one end fastened to mounting plate 43 with the opposite end thereof attached to flange 55 on rear cover bracket 54.

Each sidewall 32 of container 30 is provided with a longitudinally extending channel member 65 (FIGS. 1 and 4) secured to sidewall 32 by screw threaded fastenings 66. Spaced stabilizer roller bearings 68 and are rotatably mounted on channel member 65 and in the closed position (FIG. 2) of drawer 20 are disposed on a guide track portion 69 formed on a plate member 70 secured to mounting plate 43.

Latching mechanisms 72 are provided for aligning cover 40 and container 30 in proper relationship for sealing cover 40 to container 30 upon the closing of a drawer 20 in a manner to be described. Latch mechanisms 72 are mounted on channel members 65 (one shown in its inoperative position in FIG. 4) and include a shield 73 having flanged portions 74 and 75 (FIG. 9) secured to channel member 65. An elongated lever 76 is disposed within shield member 73 and which lever 76 is pivotally mounted on a pin 77. Pin 77 has one end secured to shield flange 74 and the other end secured to outer shield wall 78 (FIG. 9). A hook latch projection 80 is provided on one end of lever 76 (FIG. 4) and extends outwardly of an opening 81 in shield 73. Hook 80 is arranged to lie in vertical alignment (FIG. 8) with a catch projection 82 on a strip member 83 secured to flange 56 of rear cover bracket 54. The opposite end of lever 76 is provided with a camming surfaced projection 84 extending outwardly of shield 73.

Cam means (FIGS. 3 and 9) are provided on mounting plate 43 for actuating latch mechanism 72 and which cam means include a pendant member 85 pivoted on a pin 86 secured to mounting plate 43. A cam roller 89 is provided on the free end of pendant 85 and is arranged to lie in vertical alignment with lever 76. A shield 90 is provided over pendant 85 and has flanged portions secured to mounting plate 43. A lower corner of shield 90 is cut away as at 91 (FIG. 3) to allow for limited movement of pendant 85 to the left in FIG. 3 for purposes to be explained.

OPERATION

Assume that it is desired to move a drawer 20 out of its compartment 18 from the fully closed position as shown in FIG. 2 to the fully opened position as shown with respect to drawer 20 in FIG. 1. As described when drawer 20 is in closed position (FIG. 2), cover 40 is in sealed engagement with container 30 with blade 42 embedded in gasket 39. Rollers 62 on cover brackets 53 and 54 are arranged in lower track runs 50 of mounting plates 43 at opposite sidewalls of compartment 18. In order to open drawer 20 an operator grasps handle 28 on drawer front 23 and pulls drawer 20 outwardly of compartment 18 on suspension mechanisms 27. As drawer 20 commences movement it carries container 30 and cover 40 for conjoint movement therewith until rollers 62 on cover 40 engage inclined run portions 52 in camming tracks 45 and 46, causing cover 40 to move out of engagement with container 30 as drawer 20 and container 30 continue to move out of compartment 18. As cover 40 is released from container 30 tension springs 64 pull cover 40 upwardly in compartment 18 on rollers 62 moving rollers 62 along inclined track runs 52 to upper horizontal run portions 48 (FIG. 5). Further movement of cover 30 on track members 45 and 46 is prevented by the engagement of rollers 62 on front cover bracket 53 with pins 92 (one shown in FIGS. 5 and 6) secured to and between the front edges of upper horizontal track run flanges 51. Cover 40 is maintained in the moved upper position within the confines of compartment 18 by springs 64 as drawer 20 carrying container 30 is moved to fully opened position by the operator whereat the contents of the now opened container 30 are readily available and fully exposed to the operator.

It is to be noted that during the course of the movement of drawer 20 to open position stabilizer bearings 68 on container sidewalls 32 disengage tracks 69 on mounting plate 43 without effect. In addition, cam surface 84 on levers 76 of the spaced latching mechanisms 72 engage cam rollers 89 on pendants 85. Pendants 85 move to the left (FIGS. 5 and 6) in cut corner portions 91 but without effect on latching mechanism 72. As cam surfaces 84 of levers 76 disengages cam rollers 89 pendants 85 drop back into vertical position (FIG. 5) preparatory to closing of drawer 20.

In returning drawer 20 to a closed position (FIG. 2) from an open position (FIG. 1) an operator pushes drawer 20 back into compartment 18. As drawer 20 is moved into compartment 18, container 30 passes between side flanges 55 of cover front brackets 53 (FIG. 7) and stabilizer rollers 68 engage tracks 69. As drawer 20 is moved further into compartment 18 to the position shown in FIG. 6, cam rollers 89 on opposite sidewalls 13 of compartment 18 engage cam surfaces 84 on levers 76 swinging levers 76 upwardly in compartment 18 about pivot pins 77 in the direction designated by the arrow A in FIG. 6 moving hook portions 80 on levers 76 into latching engagement with catch projections 82 on strip 83 on rear cover brackets 54 latching cover 40 and container 30 in vertical alignment. Simultaneously, as levers 76 latch to cover 40 rear wall 34 of container 30 engages downwardly depending rear flange 60 on cover 40 (FIG. 6) to move cover 40 therewith toward the rear of compartment 18 with the movement of drawer 20. As container 30 and cover 40 move with drawer 20 to the rear of compartment 18, cam surface 84 on levers 76 disengage cam rollers 89. Latch hooks 80 and catch projections 82 are maintained in sliding engagement with each other by the momentum generated by the movement of drawer 20 to closed position. As rear wall 34 of container engages flange 60 of cover 40, cover 40 and rollers 62 are moved down inclined track runs 52 to lower horizontal run portions 50 in track members 45 and 46. As rollers 62 reach lower track runs 50 (broken lines FIG. 6) the downward thrust generated thereby causes blade 42 to reengage gasket 39 on container 30 to reseal cover 40 to container 30. Stabilizer rollers 68 function to absorb the impact caused by the closing of cover 40 on container 30 from being transmitted to drawer suspension 27. As drawer 20 is closed and cover 40 is sealed to container 30 hooks 80 on levers 76 drop out of engagement with catch projections 82 and fall in the direction designated by the arrow B in FIG. 6 to inoperative position (FIG. 4).

As will now be understood latching mechanisms 72 are not only effective to maintain cover 40 and container 30 in true vertical alignment during the closing of drawer 20 and the movement of cover 40 from upper horizontal runs 48 to lower runs 50 to seal cover 40 to container 30 but also function during this movement to prevent cover 40 from overtravelling container 30 during the course of downward movement.

It will be understood by those skilled in the art that the sealing means for container 30 is not limited to a blade 42 and gasket 39 arrangement as described. A modification of the sealing means which has proven to be equally effective in preventing steam and gases from entering container 30 is partially shown in FIG. 11. The modified sealing means including a gasket 94 secured about the peripheral margins of the bottom of cover 40 by staples or a suitable adhesive (not shown). Gasket 94 is provided with a triangular-shaped crown portion 95 adapted to engage the flat smooth surface of the upper peripheral edge 37a of container 30 to seal cover 40 to container 30 in the manner previously described with respect to blade 42 and gasket 39.

It will be apparent from the foregoing description that the novel container has many advantages in use. Among other advantages an efficient and economical means is provided to protect plastic articles from the destructive effects of steam without resorting to specially formed individual containers. In addition, the walls of container 30 and cover 40 provide a secondary heat barrier within the storage area of an insulated storage unit.

It will be appreciated that the conjoint movement of container 30 and cover 40 and use of the simple latching mechanism 72 serves to obviate complex mechanism which would otherwise be required to provide for engagement and disengagement of the container and cover in the opening and closing of the drawer 20.

Further, the novel mounting means for cover 40 allows for rapid sealing of container 30 in case of sudden emergency such as a fire with a minimum of effort on the part of the operator. The incorporation of this container and cover in a file cabinet of the type described permits ready access to these articles at their point of intended use and due to the hermetic sealing of cover to container does not subject these articles to changes in humidity and temperature changes when not in use.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:

1. A fire resistant storage device of the class described, comprising
   (a) a casing having a compartment open at one side thereof and having the wall portions thereof composed of fire resistant material,
   (b) closure means for selectively opening and closing said one side of said compartment,
   (c) said closure means including a wall of fire resistant material, adapted to coact with said compartment wall portions to seal said compartment when closure means is in closed position,
   (d) a storage container arranged within said compartment,
   (e) a cover for said storage container, and
   (f) means for maintaining said cover in hermetically sealed engagement with said container under conditions where said closure means is in said closed position.

2. The fire resistant storage device of claim 1 wherein said container and said cover are composed of material having a thermal conductance factor selected between the ranges of .44 and 1.30 B.t.u./(hr.)° F./sq. ft. thickness.

3. The fire resistant storage device of claim 1 wherein said container and cover are composed of wood.

4. The fire resistant storage device of claim 1 wherein said container and said cover are composed of basswood.

5. The fire resistant storage device of claim 1 wherein said container and said cover are composed of redwood.

6. A fire resistant device for storing articles of the type subject to deterioration if contacted by steam or other hot gases, said device comprising
   (a) a casing having a compartment open at one side thereof and having wall portions comprised of fire resistant material,
   (b) movable closure means mounted on said casing for movement between open and closed positions to selectively open and close said opening in said one side of said compartment,
   (c) said closure means including a wall portion of fire resistant material adapted to seal said compartment under conditions where said closure means is in said closed position,
   (d) an article storage container arranged within said compartment,
   (e) a cover for said storage container in sealing engagement with said container,
   (f) sealing means provided on said cover to hermetically seal said container,
   (g) means mounting said cover for movement out of engagement with said container when said closure means is moved to said open position, and
   (h) means for causing said cover to move into said sealing engagement with said container to seal said container and prevent hot gases from contacting articles stored therein when said cover is moved to closed position and the exterior of said casing is subjected to intense heat.

7. In article storage equipment, comprising
   (a) a cabinet,
   (b) a drawer movable into and out of said cabinet,
   (c) said drawer being open on one side thereof,
   (d) a movable cover disposed in said cabinet adjacent said drawer for closing said open side of said drawer,
   (e) means mounting said cover within said cabinet and providing for conjoint movement of said cover and said drawer upon initial movement of said drawer out of the cabinet and final movement of said drawer into the cabinet,
   (f) said mounting means comprising latch means on said drawer and catch means on said cover to align said cover with said drawer for engagement therewith, and cam means on said cabinet for causing operation of said latch means to lock with said catch means to provide for said conjoint movement upon said final movement,
   (g) said mounting means further operating to separate said cover and drawer after said initial movement and to engage said cover with said drawer towards termination of said final movement.

8. A fire resistant filing cabinet of the class described, comprising
   (a) a fire resistant casing having a compartment having an opening thereof,
   (b) a drawer mounted for movement into and out of said compartment through said opening,
   (c) a heat resistant container carried by said drawer,
   (d) a movable cover for said container,
   (e) sealing means provided on the contiguous peripheral edge portions of said cover and said container to hermatically seal said container in the closed position of said drawer,
   (f) means mounting said cover on said casing within said compartment for movement out of engagement with said container when said drawer and container are moved out of said compartment, and
   (g) means operable upon closing of said drawer to cause said cover to restore to sealing engagement with said container.

9. A fire resistant filing cabinet for storing articles of the type subject to deterioration if contacted by steam or other hot gases, said device comprising
   (a) a fire resistant casing provided with a compartment having an opening at the front thereof,
   (b) a drawer mounted for movement into and out of said compartment through said opening between closed and open positions respectively,
   (c) a heat resistant article storage container disposed in said drawer,
   (d) a cover in hermetically sealing engagement with said container in said closed position of said drawer,
   (e) means mounting said cover for movement out of engagement with said container when said drawer is moved to said open position, and
   (f) means for causing said cover to be moved into sealing engagement with said container and prevent hot gases from contacting articles stored therein when said drawer is returned to said closed position and the exterior of said casing is subjected to intense heat.

10. A fire resistant filing cabinet of the class described, comprising (a) a casing having wall portions of fire resistant material and provided with a compartment having an opening at the front end thereof, (b) a drawer mounted for movement into and out of said compartment through said opening between closed and open positions respectively, (c) said drawer including a front having a lining of fire resistant material to close the front end of said compartment and provide a sealed fire resistant compartment when said drawer is in said closed position, (d) a heat resistant storage container arranged within said drawer, (e) a movable cover for said container carried by said casing and arranged in hermetically sealing engagement with said container when said drawer is in said closed position, and (f) means operable to release said cover from said container when said drawer is moved to said open position.

11. A fire resistant filing cabinet of the class described, comprising (a) a casing provided with a compartment having an opening at the front thereof, (b) a drawer mounted for movement into and out of said compartment through said opening to closed and opened positions respectively, (c) a container arranged in said drawer, (d) a cover for said container in sealing engagement with said container, (e) support and guide means in said compartment to mount said cover for movement out of engagement with said container, (f) said support and guide means including track members at opposite sides of said compartment and each track member having a lower horizontal run and an upper horizontal run portion and an inclined surface connecting said run portions, (g) rollers mounted on said cover and each arranged on a said track member in said lower run portions when said cover is in said sealed engagement, and (h) means operable to move said rollers along said inclined run to said upper run portions when said drawer is moved to opened position to release said cover from said container.

12. The combination of claim 11 wherein said means for moving said cover and rollers to the upper horizontal track run include a tension spring member having one end secured to said cover and the other end fixed to said casing.

13. A fire resistant filing cabinet of the class described, comprising (a) a casing provided with a compartment having an opening at the front thereof, (b) a drawer mounted for movement into and out of said compartment through said opening to closed and opened positions respectively, (c) a container within said drawer, (d) a cover for said container, (e) support and guide means in said compartment for said cover, (f) said support and guide means including track members at opposite sides of said compartment and rollers on said cover arranged in said track members, (g) said track members each provided with an upper horizontal run portion and a lower horizontal run portion interconnected by an inclined run portion, (h) said rollers on said cover arranged in said upper run portion to maintain said cover within said compartment when said drawer is in said open position, (i) means on said container adapted to engage said cover when said drawer is moved to said closed positions from said opened position effective to move said cover and said rollers to said lower run portion, and (j) sealing means on said cover adapted to engage said container when said cover is moved to said lower run to hermetically seal said container.

14. The combination of claim 13 wherein said sealing means include a gasket member mounted on the peripheral edges of said cover adapted to engage the peripheral upper edge portion of the container when said drawer is closed.

15. The combination of claim 13 wherein said sealing means include a gasket member on the peripheral edges of said container and a blade in the peripheral edges of said cover adapted to engage said gasket member when the drawer is moved to closed position.

16. A fire resistant filing cabinet of the class described, comprising (a) a casing provided with a compartment having an opening at the front thereof, (b) a drawer mounted for movement into and out of said compartment through said opening to closed and opened positions respectively, (c) a wooden container arranged in said drawer, (d) a wooden cover for said container, (e) spaced bracket members on said cover, (f) roller means on said brackets, (g) track members mounted on opposite side walls of said compartment and each track member having an upper and a lower horizontal run portion interconnected by an inclined run portion, (h) said roller means on said cover arranged in said upper track portion when said drawer is in an open position, (i) means on said container adapted to engage said cover when said drawer is moved to said closed position from said open position effective to move said cover and roller means to said lower track run portions, (j) sealing means on said cover adapted to engage and seal said container when said cover is moved to said lower run portion, and (k) spring means operative to move said roller means along said inclined run portion to said upper horizontal run portion when the drawer is moved to open position to release said cover from said container.

17. In a fire ressitant filing cabinet of the class described, comprising (a) a casing provided with a compartment having an opening at the front thereof, (b) a drawer mounted for movement into and out of said compartment through said opening to closed and opened positions respectively, (c) a container carried by said drawer, (d) a cover for said container, (e) support and guide means provided in said compartment to mount said cover in said compartment, (f) said support and guide means including track members on opposite sidewalls of said compartment and rollers on the opposite sidewalls of said cover arranged in said track members, (g) said track members each provided with upper and lower run portions interconnected by an inclined run portion, (h) said rollers on said cover arranged in said upper run portions out of engagement with said container under conditions where said drawer is in said open position, (i) means on said container adapted to engage said cover when said drawer is moved from said open positions to said closed position to move said cover and said rollers to said lower run portions of said track members, (j) latch means on said container and catch means on said cover to align said cover with said container for engagement therewith, and (k) cam means on said casing for causing operation of said latch means to lock with said catch means when said drawer is moved to closed position.

18. The fire resistant cabinet of claim 17 wherein said latch means for aligning said container and cover include a lever pivotally mounted on said container and said catch means including a catch member on said cover and said combination further including said moving cam member mounted on said casing adapted to engage and pivot said lever into latching engagement with said catch member when the drawer is moved to closed position.

References Cited by the Examiner
UNITED STATES PATENTS

| | | | |
|---|---|---|---|
| 1,606,151 | 11/1926 | Dahnke | 109—84 X |
| 1,906,723 | 5/1933 | Rosendahl | 312—270 |
| 2,665,564 | 1/1954 | Janos et al. | 312—270 X |
| 2,668,091 | 2/1954 | Clark | 312—270 |
| 2,942,926 | 6/1960 | Pavelka | 312—270 |

CLAUDE A. LE ROY, *Primary Examiner.*

CHANCELLOR E. HARRIS, *Examiner.*

F. DOMOTOR, *Assistant Examiner.*